United States Patent
Huang-Fu et al.

(10) Patent No.: US 10,972,956 B2
(45) Date of Patent: Apr. 6, 2021

(54) ENHANCED HANDLING ON QOS FLOW DESCRIPTION

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Shang-Ru Mo, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 46 days.

(21) Appl. No.: 16/530,152

(22) Filed: Aug. 2, 2019

(65) Prior Publication Data

US 2020/0053596 A1 Feb. 13, 2020

Related U.S. Application Data

(60) Provisional application No. 62/717,352, filed on Aug. 10, 2018.

(51) Int. Cl.
*H04W 40/02* (2009.01)
*H04W 48/12* (2009.01)
(Continued)

(52) U.S. Cl.
CPC ........... *H04W 40/02* (2013.01); *H04L 45/306* (2013.01); *H04L 47/20* (2013.01);
(Continued)

(58) Field of Classification Search
None
See application file for complete search history.

(56) References Cited

U.S. PATENT DOCUMENTS

2004/0109466 A1  6/2004  Van Ackere et al. .......... 370/419
2008/0192925 A1  8/2008  Sachs et al. .................... 380/29
(Continued)

FOREIGN PATENT DOCUMENTS

CN  101895966 A  11/2010
CN  102724736 A  10/2012
(Continued)

OTHER PUBLICATIONS

Taiwan IPO, office action for the TW patent application 108128518 (no English translation is available) dated Jul. 10, 2020 (10 pages).
(Continued)

*Primary Examiner* — Christine T Duong
(74) *Attorney, Agent, or Firm* — Imperium Patent Works; Zheng Jin (57) ABSTRACT

A method of QoS rule management with enhanced handling on QoS flow description is proposed. UE checks QoS configuration received from the network for QoS operation errors. When UE receives a QoS rule associated with a specific QFI but has no QoS flow description for the QFI, UE further determines whether the QoS rule is of a GBR QoS flow. If so, UE detects a QoS operation error. If the QoS rule is the default QoS rule, then UE releases the PDU session. If the QoS rule is not the default QoS rule, then UE either rejects a PDU session modification command that carries the QoS rule or deletes the QoS rule carried by a PDU session establishment accept with a 5GSM cause value indicating the QoS operation error.

20 Claims, 5 Drawing Sheets

(51) Int. Cl.

| | | |
|---|---|---|
| *H04L 12/813* | (2013.01) | |
| *H04L 29/06* | (2006.01) | |
| *H04L 12/725* | (2013.01) | |
| *H04W 28/02* | (2009.01) | |
| *H04W 28/12* | (2009.01) | |
| *H04W 36/00* | (2009.01) | |
| *H04W 36/14* | (2009.01) | |
| *H04W 68/02* | (2009.01) | |
| *H04W 76/27* | (2018.01) | |
| *H04L 29/08* | (2006.01) | |
| *H04W 28/04* | (2009.01) | |
| *H04W 8/18* | (2009.01) | |
| *H04W 36/08* | (2009.01) | |
| *H04W 48/18* | (2009.01) | |
| *H04W 84/04* | (2009.01) | |

(52) U.S. Cl.
CPC ........ *H04L 65/1003* (2013.01); *H04L 67/141* (2013.01); *H04L 67/146* (2013.01); *H04L 67/148* (2013.01); *H04W 8/183* (2013.01); *H04W 28/0215* (2013.01); *H04W 28/0252* (2013.01); *H04W 28/0268* (2013.01); *H04W 28/04* (2013.01); *H04W 28/12* (2013.01); *H04W 36/0022* (2013.01); *H04W 36/08* (2013.01); *H04W 36/14* (2013.01); *H04W 48/12* (2013.01); *H04W 48/18* (2013.01); *H04W 68/02* (2013.01); *H04W 76/27* (2018.02); *H04W 84/042* (2013.01)

(56) References Cited

U.S. PATENT DOCUMENTS

| | | | |
|---|---|---|---|
| 2012/0082132 A1 | 4/2012 | Andreasen et al. | 370/331 |
| 2014/0112150 A1 | 4/2014 | Ko et al. | 370/236 |
| 2014/0241264 A1 | 8/2014 | Liu | 370/329 |
| 2015/0296431 A1 | 10/2015 | Li et al. | 370/331 |
| 2015/0351021 A1 | 12/2015 | Zhang et al. | 455/432.1 |
| 2017/0135005 A1 | 5/2017 | Basu Mallick et al. | 455/434 |
| 2017/0339609 A1 | 11/2017 | Youn et al. | |
| 2018/0048537 A1 | 2/2018 | Gaikwad et al. | |
| 2018/0049218 A1 | 2/2018 | Hapsari et al. | |
| 2018/0070276 A1 | 3/2018 | Wu | |
| 2018/0220290 A1 | 8/2018 | Sivavakeesar | |
| 2018/0220338 A1 | 8/2018 | Tabe et al. | |
| 2018/0220344 A1 | 8/2018 | Shaheen | |
| 2018/0279214 A1 | 9/2018 | Chandramouli et al. | |
| 2018/0288654 A1 | 10/2018 | Shih et al. | |
| 2018/0324577 A1 | 11/2018 | Faccin et al. | |
| 2019/0029057 A1* | 1/2019 | Pan | H04W 28/0268 |
| 2019/0053308 A1 | 2/2019 | Castellanos Zamora et al. | |
| 2019/0166647 A1 | 5/2019 | Velev et al. | |
| 2019/0174573 A1 | 6/2019 | Velev et al. | |
| 2019/0223060 A1 | 7/2019 | Zhou et al. | |
| 2019/0253870 A1 | 8/2019 | Ronneke et al. | |
| 2019/0289506 A1 | 9/2019 | Park et al. | |
| 2019/0313310 A1* | 10/2019 | Won | H04W 28/16 |
| 2020/0053562 A1 | 2/2020 | Kim et al. | |
| 2020/0053642 A1 | 2/2020 | Huang-Fu et al. | |
| 2020/0154389 A1 | 5/2020 | Karampatsis et al. | |
| 2020/0178196 A1 | 6/2020 | Wang et al. | |

FOREIGN PATENT DOCUMENTS

| | | |
|---|---|---|
| CN | 103517325 A | 1/2014 |
| CN | 107592331 A | 1/2018 |
| CN | 107690161 A | 2/2018 |
| CN | 107925862 A | 4/2018 |
| CN | 108307449 A | 7/2018 |
| EP | 3557905 A1 | 10/2019 |
| WO | WO2014114525 A1 | 7/2014 |
| WO | WO2018034337 A1 | 2/2018 |
| WO | WO2018065060 A1 | 4/2018 |
| WO | WO2018070436 A1 | 4/2018 |
| WO | WO2018111029 A1 | 6/2018 |

OTHER PUBLICATIONS

3GPP TR 24.890 V15.1.0 (Mar. 2018), 3rd Generation Partnership Project; Technical Specification Group Core Network and Terminals; 5G System—phase 1; CT WG1 Aspects (Release 15) *sections 6.1, 8.5.1.2.7, 8.5.1.3.2.1.1.3, 8.5.3.1.1, 8.5.3.1.2, 8.5.3.2.2.1, 8.5. 3.2.2.3, 9.3.4, 9.5.3.1, 9.5.3.2, 10.3.2*.

USPTO, office action U.S. Appl. No. 16/535,580 dated Aug. 4, 2020 (18 pages).

International Search Report and Written Opinion of International Search Authority for PCT/CN2019/100199 dated Oct. 30, 2019 (8 pages).

3GPP TS 23.502 V15.2.0 (Jun. 2018), 3rd Generation Partnership Project; Technical Specification Group Services and System Aspects; Procedures for the 5G System; Stage 2 (Release 15) *pp. 55-63, 125-128*.

C1-173057 3GPP TSG-CT WG1 Meeting #105, Huawei et al., "5GSM message for PDU session anchor relocation for SSC mode 2 and SSC mode 3", Krakow, Poland, Aug. 21-25, 2017 (5 pages).

International Search Report and Written Opinion of International Search Authority for PCT/CN2019/100218 dated Nov. 4, 2019 (9 pages).

International Search Report and Written Opinion of International Search Authority for PCT/CN2019/099889 dated Oct. 31, 2019 (9 pages).

3GPP TS 24.501 v15.0.0 (Jun. 2018), 3rd Generation Partnership Project; Technical Specification Group Core Network and Terminals; Non-Access-Stratum (NAS) protocol for 5G System (5GS); Stage 3 (Release 15) *clause 6.1 to 6.2.3*.

International Search Report and Written Opinion of International Search Authority for PCT/CN2019/099719 dated Oct. 31, 2019 (9 pages).

C1-184425 3GPP TSG-CT WG1 Meeting #111bis, MediaTek Inc., "Exception handling in QoS operation", Sophia-Antipolis, France, Jul. 9-13, 2018 (8 pages).

C1-184614 3GPP TSG CT WG1 Meeting #111 bis, MediaTek Inc., "Exception handling in QoS operation", Sophia-Antipolis, France, Jul. 9-13, 2018 (7 pages).

Taiwan IPO, office action for the TW patent application 108127878 (no English translation is available) dated Apr. 17, 2020 (7 pages).

C1-173817 3GPP TSG-CT WG1 Meeting #106, Ericsson et al, "5G QoS-errors in QoS rules IE", Kochi, India, Oct. 23-27, 2017 (19 pages) *sections 9, 12*.

C1-184425 3GPP TSG-CT WG1 Meeting #111 bis, MediaTek Inc., "Exception handling in QoS operation", Sophia-Antipolis, France, Jul. 9-13, 2018 (8 pages). *section 6*.

Taiwan IPO, office action for the TW patent application 108128520 (no English translation is available) dated Apr. 24, 2020 (6 pages).

3GPP TS 23.503 V1.0.0 (Dec. 2017), 3rd Generation Partnership Project; Technical Specification Group Services and System Aspects; Policy and Charging Control Framework for the 5G System; Stage 2 (Release 15) *see 4.2.2, 6.1.2.2, 6.2.2*.

Taiwan IPO, office action for the TW patent application 108128251 (no English translation is available) dated Mar. 31, 2020 (6 pages).

3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15), *section 4.4.2, 6.1-6.2.3, 8.3.9.1, 9.10.3-4*.

International Search Report and Written Opinion of International Search Authority for PCT/CN2019/099905 dated Nov. 19, 2019 (10 pages).

R3-171125 3GPP TSG-RAN WG2 #95bis, Nokia et al., "PDU Session Modification Procedure", Spokane, USA, Apr. 3-7, 2017 (3 pages).

International Search Report and Written Opinion of International Search Authority for PCT/CN2019/100200 dated Nov. 14, 2019 (9 pages).

(56) References Cited

OTHER PUBLICATIONS

3GPP TS 23.503 V1.0.0 (Dec. 2012), 3rd Generation Partnership Project; Technical Specification Group Services and System Aspects; Policy and Charging Control Framework for the 5G System; Stage 2 (Release 15) *see 4.2.2 and 6.1.2*.
USPTO, office action for related U.S. Appl. No. 16/535,691 dated Feb. 4, 2020 (12 pages).
USPTO, office action for related U.S. Appl. No. 16/535,691 dated Sep. 23, 2020 (15 pages).
USPTO, office action for related U.S. Appl. No. 16/535,730 dated Oct. 6, 2020 (14 pages).
U.S. Appl. No. 16/535,730 USPTO OA reference, 3GPP TSG-CT WG1 Meeting #109 C1-18daaa, Nokia et al., "Route selection descriptors in a URSP rule", Montreal, Canada, Feb. 26-Mar. 2, 2018 (3 pages).
Taiwan IPO, office action for the TW patent application 108128522 (no English translation is available) dated Nov. 19, 2020 (27 pages).
3GPP TR 23.727 V0.2.0 (Jun. 2018), 3rd Generation Partnership Project; Technical Specification Group Services and System Aspects; Study on Application Awareness Interworking between LTE and NR (Release 16) *sections 2, 4, 5.1.1, 6.1.2, 6.3.1.1, 6.4.1*.
3GPP TS 23.122 V15.4.0 (Jun. 2018), 3rd Generation Partnership Project; Technical Specification Group Core Network and Terminals; Non-access-Stratum (NAS) function related to Mobile Station (MS) in idle mode (Release 15) *1.2, 2, 3.1, 4.4.3, 4.4.3.1, 4.4.3.1.1, 4.4.3.1.2, 4.4.3.3.1, 4.4.4*.
USPTO, office action for related U.S. Appl. No. 16/535,580 dated Dec. 22, 2020 (23 pages).
3GPP TR 24.890 V15.1.0 (Mar. 2018), 3rd Generation Partnership Project; Technical Specification Group Core Network and Terminals; 5G System—phase 1; CT WG1 Aspects (Release 15).

* cited by examiner

| 8 | 7 | 6 | 5 | 4 | 3 | 2 | 1 | |
|---|---|---|---|---|---|---|---|---|
| QoS rule identifier ||||||||  octet 4 |
| Length of QoS rule |||||||| octet 5 |
| |||||||| octet 6 |
| Rule operation code ||| DQR bit | Number of packet filters |||| octet 7 |
| Packet filter list |||||||| octet 8* |
| |||||||| octet m* |
| QoS rule precedence |||||||| octet m+1* |
| 0 Spare | Segregation | QoS flow identifier (QFI) |||||| octet m+2* |

Figure 9.11.4.13.2: QoS rule (u=m+2)

FIG. 3

| 8 | 7 | 6 | 5 | 4 | 3 | 2 | 1 | |
|---|---|---|---|---|---|---|---|---|
| 0 Spare | 0 Spare | QFI |||||| octet 4 |
| Operation code ||| 0 Spare | 0 Spare | 0 Spare | 0 Spare | 0 Spare | octet 5 |
| 0 Spare | E | Number of parameters |||||| octet 6 |
| Parameters list |||||||| octet 7* |
| |||||||| octet u* |

Figure 9.11.4.12.2: QoS flow description

ENHANCED HANDLING ON QOS FLOW DESCRIPTION

CROSS REFERENCE TO RELATED APPLICATIONS

This application claims priority under 35 U.S.C. § 119 from U.S. Provisional Application No. 62/717,352, entitled "Performance Enhancement in 5G System", filed on Aug. 10, 2018, the subject matter of which is incorporated herein by reference.

TECHNICAL FIELD

The disclosed embodiments relate generally to wireless communication, and, more particularly, to method of enhanced handling on Quality of Service (QoS) flow description in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G, a Protocol Data Unit (PDU) session establishment is a parallel procedure of a Packet Data Network (PDN) connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule.

Quality of Service (QoS) indicates the performance from the perspective of network users. All types of traffic mapped to the same LIE EPS bearer or to the same 5G QoS flow receive the same level of packet forwarding treatment (e.g., scheduling policy, queue management policy, rate shaping policy, RLC configuration etc.) Providing different QoS forwarding treatment requires separate 5G QoS flow. Each QoS flow may include multiple QoS rules consisting of QoS profile, packet filters, and precedence order. QoS profile includes QoS parameters and QoS marking. Packet filter is used for binding a QoS flow to a specific QoS marking. Precedence order represents the priority to adapt a QoS rule to a QoS flow. UE performs the classification and marking of uplink (UL) User Plane traffic, i.e., the association of UL traffic to QoS flows based on QoS rules.

The QoS flow parameters, provisioned by the network via QoS Flow Description IE, are separated from the QoS rule IE. When the network configures a QoS rule of a QFI, the network may not provide the corresponding QoS flow description. A solution is sought for UE to handle such QoS rule configuration without providing corresponding QoS flow description.

SUMMARY

A method of QoS rule management with enhanced handling on QoS flow description is proposed. UE checks QoS configuration received from the network for QoS operation errors. When UE receives a QoS rule associated with a specific QFI but has no QoS flow description for the QFI, UE further determines whether the QoS rule is of a GBR QoS flow. If so, UE detects a QoS operation error. If the QoS rule is the default QoS rule, then UE releases the PDU session. If the QoS rule is not the default QoS rule, then UE either rejects a PDU session modification command that carries the QoS rule or deletes the QoS rule carried by a PDU session establishment accept with a 5GSM cause value indicating the QoS operation error.

In one embodiment, a UE receives a Protocol data unit (PDU) session modification command message for performing the QoS operation associated with a PDU session based at least on one of a QoS rules information element (IE) and a QoS flow descriptions IE in the mobile communication network. The UE determines that a QoS rule associated with a QoS flow having a specific QoS flow ID (QFI) has no corresponding QoS flow description, wherein the specific QFI indicates a guaranteed bit rate (GBR) QoS flow. The UE deletes the QoS rule after completing the QoS operation if the QoS rules IE contains another valid QoS rule, or rejecting the PDU session modification command message if the QoS rules IE does not contain another valid QoS rule, wherein the QoS rule is not a default QoS rule.

In another embodiment, the UE receives a Protocol data unit (PDU) session establishment accept message for performing a Quality of Service (QoS) operation associated with a PDU session based at least on one of a QoS rules information element (IE) and a QoS flow descriptions IE in a mobile communication network. The UE determines that a QoS rule associated with a QoS flow having a specific QoS flow ID (QFI) has no corresponding QoS flow description after the QoS operation. The UE determines that the QoS flow having the specific QFI has a guaranteed bit rate (GBR) QoS flow resource type. The UE deletes the QoS rule if the QoS rule is not a default QoS rule or releases the PDU session if the QoS rule is the default QoS rule.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
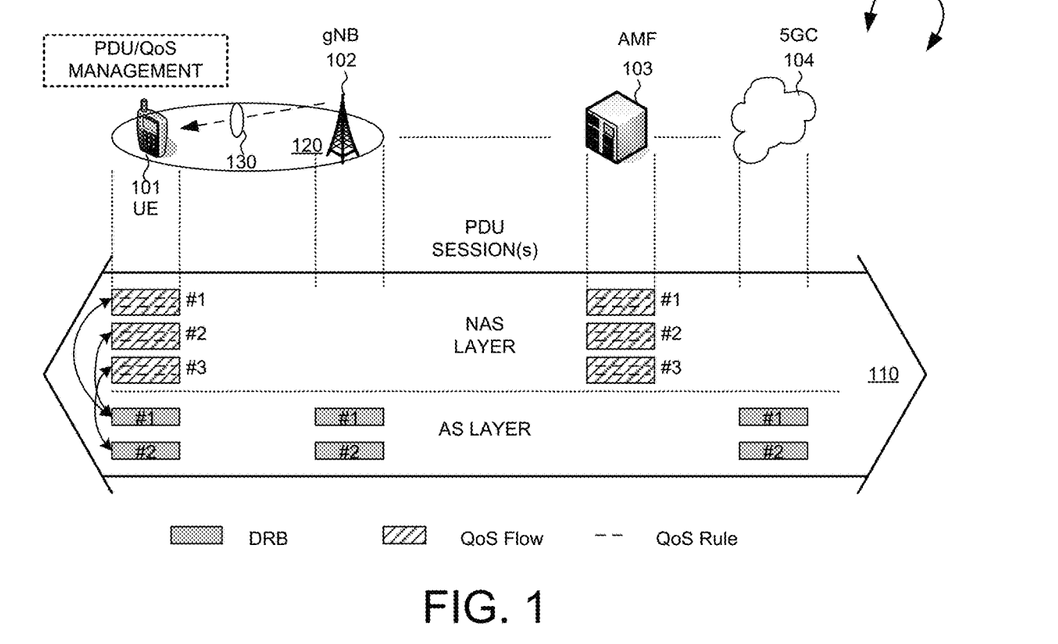
FIG. 1 illustrates an exemplary 5G network supporting Quality of Service (QoS) rule management in accordance with one novel aspect.

FIG. 1 illustrates an exemplary 5G network 100 supporting Quality of Service (QoS) rule management in accordance with one novel aspect. 5G new radio (NR) network 100 comprises a user equipment UE 101, a base station gNB 102, an access and mobility management function (AMF) 103, and a 5G core network 5GC 104. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF 103 communicates with gNB 102 and 5GC 104 for access and mobility management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS networks are packet-switched (PS) Internet Protocol (IP) networks. This means that the networks deliver all data traffic in IP packets, and provide users with Always-On IP Connectivity. When UE joins a 5GS network, a Packet Data Network (PDN) address (i.e., the one that can be used on the PDN) is assigned to the UE for its connection to PDN. In 4G, EPS has defined a Default EPS Bearer to provide the IP Connectivity that is Always-On. In 5G, a Protocol Data Unit (PDU) session establishment procedure is a parallel procedure of a PDN connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow.

In the example of FIG. 1, UE 101 establishes a PDU session 110, which includes multiple QoS flows and QoS rules in Non-Acess Stratum (NAS) layer. Each. QoS flow needs to be supported by a mapping Data Radio Bearer (DRB) in Access Stratum (AS) layer. Multiple QoS flows can be mapped to the same DRB. For example, QoS flows #1 and #2 are mapped to DRB #1, and QoS flow #3 is mapped to DRB #2. If there is a default DRB for a PDU session, then all traffic of QoS flows that have no mapping DRBs are sent via the default DRB. In the current 5G NAS specification, based on QoS operation codes defined in the QoS rule IE and QoS flow description IE, the allowed different QoS operations includes to create, modify, and delete QoS rule and QoS flow description via PDU session establishment and modification procedures. The QoS flow parameters, however, provisioned by the network via QoS flow description IE, are separated from the QoS rule IF. As a result, when the network configures a QoS rule having a QFI, the network may not provide the corresponding QoS flow description for the QFI. In addition, the QoS rule may be of a guaranteed bit rate (GER) QoS flow, which requires QoS flow parameters for data transmission and reception. It is not clear how UE should handle such scenario.

In accordance with one novel aspect, UE behavior and error handling are defined for QoS rule operations via PDU session establishment and modification procedures. The default QoS rule indication (DQR) and the QoS flow identifier (QFI) of a signaled QoS rule should not be changed. The UE should check the QoS configuration (130) provided in the PDU session modification command message and in the PDU session establishment accept message for QoS operation errors. In one example, when UE 101 receives a QoS rule associated with a specific QFI but has no QoS flow description for the QFI, in addition, UE 101 determines that the QoS rule is of a GBR QoS flow, then UE 101 detects a QoS operation error. If the QoS rule is the default QoS rule, then UE 101 releases the PDU session. If the QoS rule is not the default QoS rule, then UE 101 either rejects a PDU session modification command that carries the QoS rule or deletes the QoS rule carried by a PDU session modification request with a 5GSM cause value indicating the QoS operation error.

Figure 2:
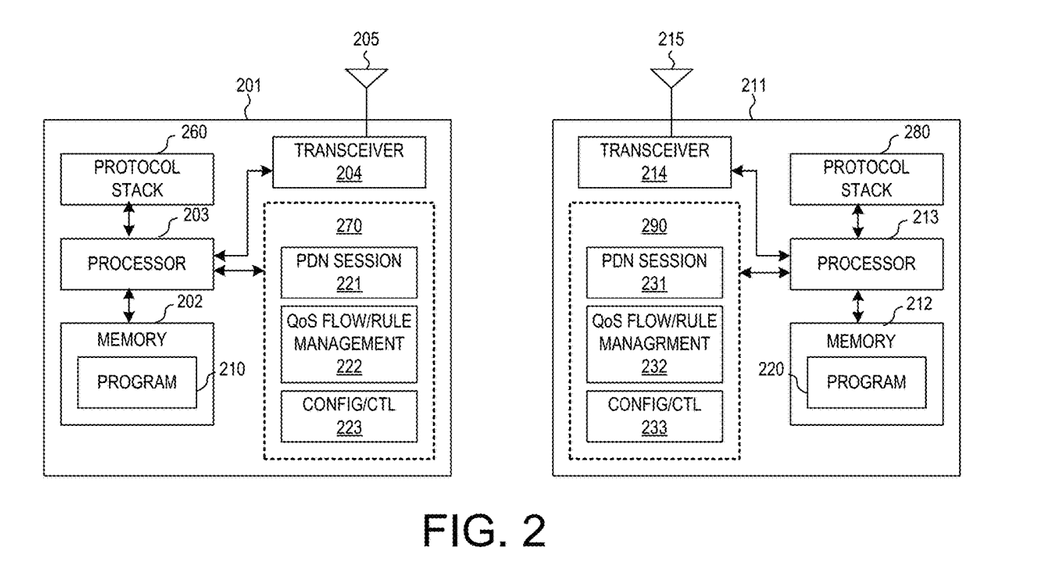
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session handling circuit 231 handles PDU session establishment and modification procedures. QoS flow and rule management circuit 232 creates, modifies, and deletes QoS flows and QoS rules for UE. Configuration and control circuit 233 provides different parameters to configure and control UE of related functionalities including mobility management and session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a QoS flow and rule management circuit 222 that manages, creates, modifies, and deletes QoS flows and QoS rules, a config and control circuit 223 that handles configuration and control parameters for mobility management and session management.

Figure 3:
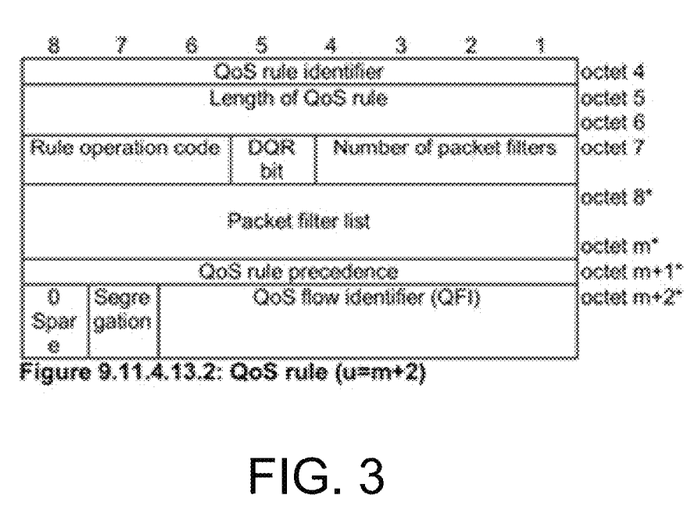
FIG. 3 illustrates one embodiment of a QoS rule comprising a QoS rule identifier (QRI) and a QoS flow identifier (QFI).

FIG. 3 illustrates one embodiment of a QoS rule comprising a QoS rule identifier (QRI) and a QoS flow identifier (QFI). The network can provide a QoS rule IE to the UE, which comprises a list of QoS rules. Each QoS rule, as depicted by FIG. 3, comprises a QoS rule identifier (QRI), a length of the QoS rule, a rule operation code, a default QoS rule (DQR) bit, a number of packet filters, a packet filter list, a QoS rule precedence, and a QoS flow identifier (QFI). Since QFI identifies a corresponding QoS flow, the QoS rule having the specific QFI is thus associated with the QoS flow through the same specific QFI.

Figure 4:
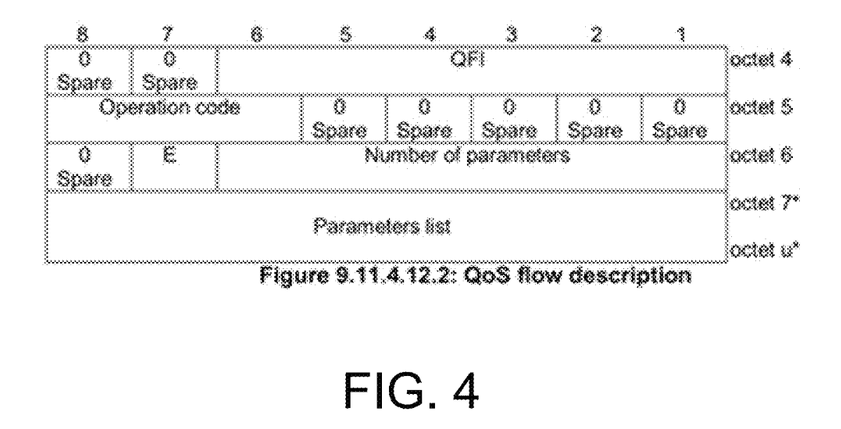
FIG. 4 illustrates one embodiment of a QoS flow description identified by a QFI.

FIG. 4 illustrates one embodiment of a QoS flow description identified by a QFI. The network can provide a QoS flow description IE to the UE, which comprises a list of QoS flow descriptions. Each QoS flow description, as depicted by FIG. 4, comprises a QFI, a QoS flow operation code, a number of QoS flow parameters, and a QoS flow parameter list. As defined by the 3GPP specification, a parameter identifier field is used to identify each parameter included in the parameter list and it contains the hexadecimal coding of the parameter identifier. For example, the following parameter identifiers are specified: 01H(5QI), 02H(GFBR uplink), 03H(GFBR downlink), 04H(MFBR uplink), 05H(MFBR downlink), 06H(averaging window), 07H(EPS bearer identity). The 3GPP specification also defines the standardized 5QI to QoS characteristics mapping, e.g., which 5QI is mapped to GBR resource type, and which 5QI is mapped to non-GBR resource type.

Figure 5:
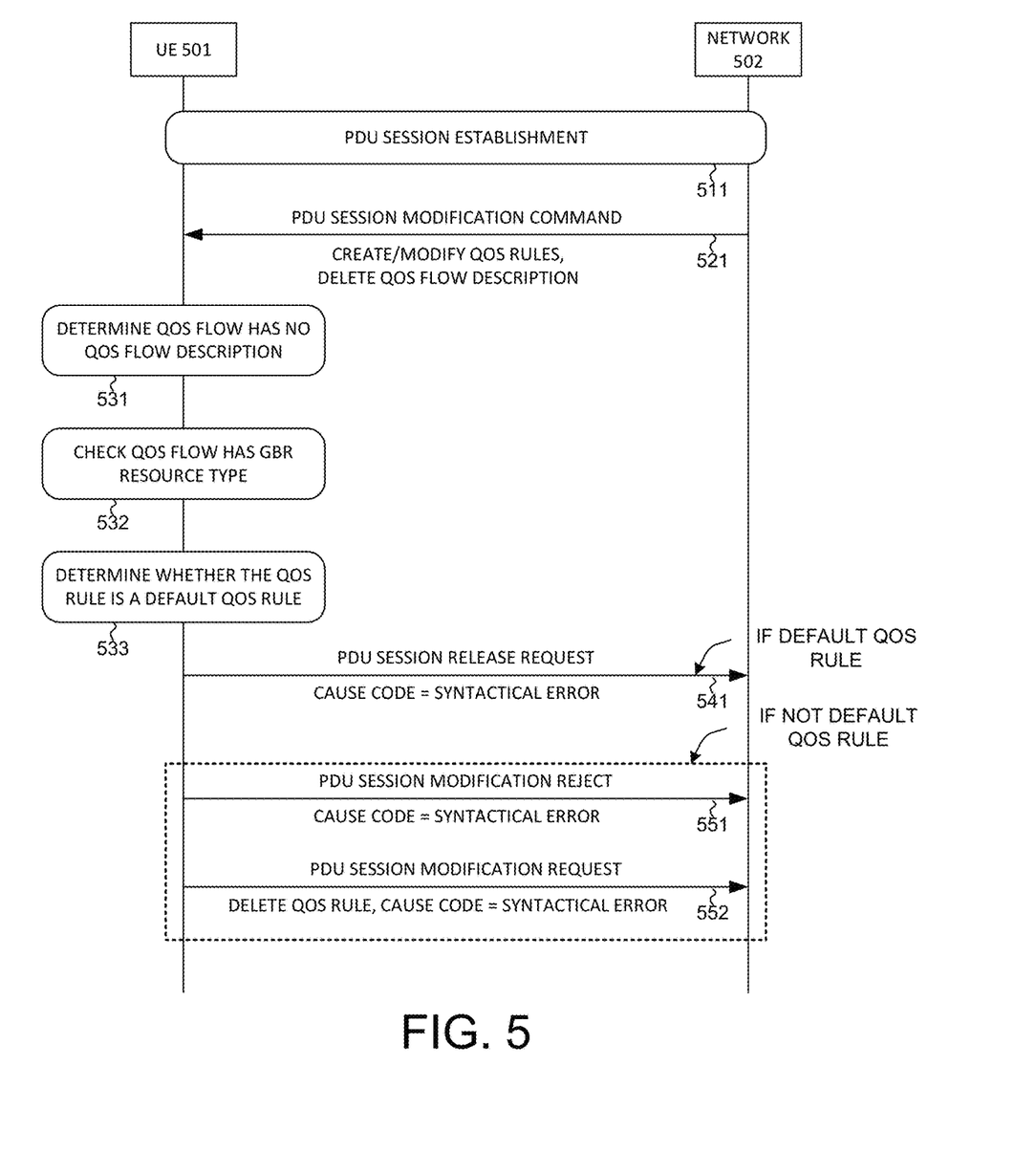
FIG. 5 illustrates a one embodiment of PDU session modification procedure with enhanced QoS flow description handling in accordance with one novel aspects.

FIG. 5 illustrates a one embodiment of PDU session modification procedure with enhanced QoS flow description handling in accordance with one novel aspect. In step 511, UE 501 and network 502 establish a PDU session via a PDU session establishment procedure. The PDU session may be established to comprise one or more QoS rules, including one default QoS rule. Each QoS rule is associated with a QoS flow identified by a QFI. In step 521, network 502 sends a PDU session modification command message to UE 501. The command message is for UE to perform certain QoS operations for the PDU session, for example, to create a new QoS rule or new QoS flow description, and/or to modify an existing QoS rule or existing QoS flow description. The command message carries a QoS rule IE and/or QoS flow description IE for such QoS operations. In step 531, UE 501 determines whether the QoS operation would result in the existing, to-be-created or to-be-modified QoS rule to have empty QoS flow description.

QoS rule having empty QoS flow description can happen under different QoS operations. First, if the QoS operation is to create a new QoS rule having a specific QFI but the network does not provide corresponding QoS flow description for the specific QFI, then the to-be-created QoS rule will have empty QoS flow description. Second, if the QoS operation is to delete existing QoS flow description of a QFI, then such deletion can result in the QoS rule associated to the QFI to have empty QoS flow description. Third, if the QoS operation is to modify existing QoS rule by changing to a new QFI, then the QoS rule associated to the new QFI will have no QoS flow description.

In step 532, UE 501 checks whether the existing, to-be-created or to-be-modified QoS rule is of a GBR QoS flow. If so, then a QoS operation error occurs, because the QoS rule should not have an empty QoS flow description for GBR QoS flow. In order for UE to properly control traffic flow under a GBR QoS flow, the UE needs to know the detailed QoS flow parameters such as GFBR and MFBR for the uplink and for the downlink. As a result, it is an error for GBR QoS flow to not be configured with QoS flow description. UE can make the determination under different scenarios. In a first example, a GBR QoS flow can use 5QI as QFI in the description part of a QoS flow. Since 5QI value is mapped to QoS characteristics including GBR or non-GBR resource type, UE thus can determine whether a QoS rule is of a GBR or non-GBR QoS flow. In another example, the QoS rule is provided together with a QoS flow description that indicates it is a GBR QoS flow. However, the QoS flow description is to be deleted, and UE thus is able to determine that the QoS rule is of a GBR QoS flow but with no QoS flow description.

In step 533, UE 501 further detects whether the existing, to-be-created or to-be-modified QoS rule is default QoS rule. If the detecting result in step 533 is positive, that means the QoS rule is a default QoS rule, then such syntactical error causes problem with the default QoS rule of the PDU session. As a result, the PDU session should be released. In step 541, UE 501 initiates a PDU session release procedure by sending a PDU session release request message to network 502. The request message carries a 5GSM cause value #84 indicating "syntactical error in the QoS operation". If the detecting result is negative in step 533, that means the QoS rule is not a default QoS rule. Then in step 551, UE 501 rejects the PDU session modification command message with the 5GSM cause value #84 indicating "syntactical error in the QoS operation" if the QoS rules IE contains no other QoS rule. On the other hand, if the QoS rules IE contains other QoS, then in step 552, UE 501 shall delete the corresponding QoS rule which has no corresponding QoS flow description by initiating a PDU session modification procedure after the completion of the current PDU session modification procedure.

Figure 6:
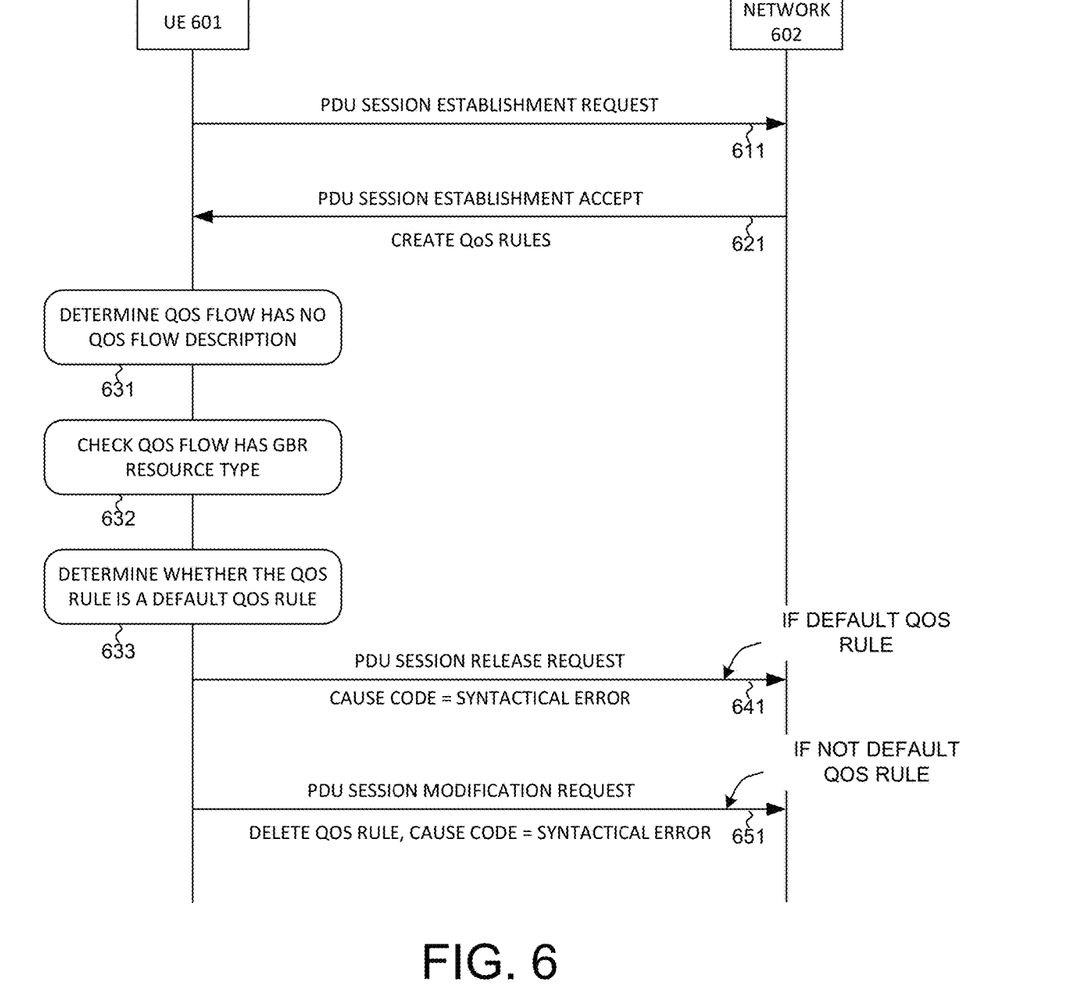
FIG. 6 illustrates a one embodiment of PDU session establishment procedure with enhanced QoS flow description handling in accordance with one novel aspects.

FIG. 6 illustrates a one embodiment of PDU session establishment procedure with enhanced QoS flow description handling in accordance with one novel aspect. In step 611, UE 601 sends a PDU session establishment request message to network 602. In step 621, network 602 sends a PDU session establishment accept message to UE 601. The accept message carries a QoS rule IE and/or QoS flow description IE for the UE to create new QoS rules and QoS flow descriptions. In step 631, UE 601 determines whether the QoS operation would result in the to-be-created QoS rule to have empty QoS flow description. In step 632, UE 601 checks whether the to-be-created QoS rule is of a GBR QoS flow resource type. If so, then a QoS operation error occurs, because the QoS rule should not have an empty QoS flow description for GBR QoS flow.

In step 633, UE 601 further detects whether the to-be-created QoS rule is a default QoS rule. If the detecting result in step 633 is positive, that means the QoS rule is a default QoS rule, then such syntactical error causes problem with the default QoS rule of the PDU session. As a result, the PDU session should be released. In step 641, UE 601 initiates a PDU session release procedure by sending a PDU session release request message to network 602. The request message carries a 5GSM cause value #84 indicating "syntactical error in the QoS operation". If the detecting result is negative in step 633, that means the QoS rule is not a default QoS rule. Then in step 651, UE 601 deletes the QoS rule by sending a PDU session modification request message to network 602 with the 5GSM cause value #84 indicating "syntactical error in the QoS operation".

Figure 7:
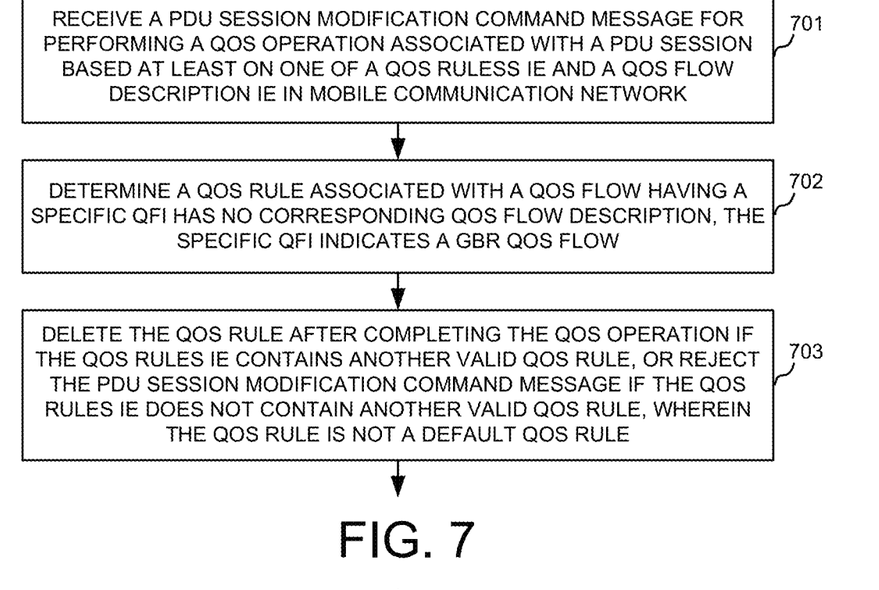
FIG. 7 is a flow chart of a method of QoS flow description handling for PDU session modification procedure in accordance with one novel aspect of the present invention.

FIG. 7 is a flow chart of a method of QoS flow description handling for PDU session modification procedure in accordance with one novel aspect of the present invention. In step 701, a UE receives a Protocol data unit (PDU) session modification command message for performing the QoS operation associated with a PDU session based at least on one of a QoS rules information element (IE) and a QoS flow descriptions IE in the mobile communication network. In step 702, the UE determines that a QoS rule associated with a QoS flow having a specific QoS flow ID (QFI) has no corresponding QoS flow description, wherein the specific QFI indicates a guaranteed bit rate (GBR) QoS flow. In step 703, the UE deletes the QoS rule after completing the QoS operation if the QoS rules IE contains another valid QoS rule, or rejecting the PDU session modification command message if the QoS rules IE does not contain another valid QoS rule, wherein the QoS rule is not a default QoS rule.

Figure 8:
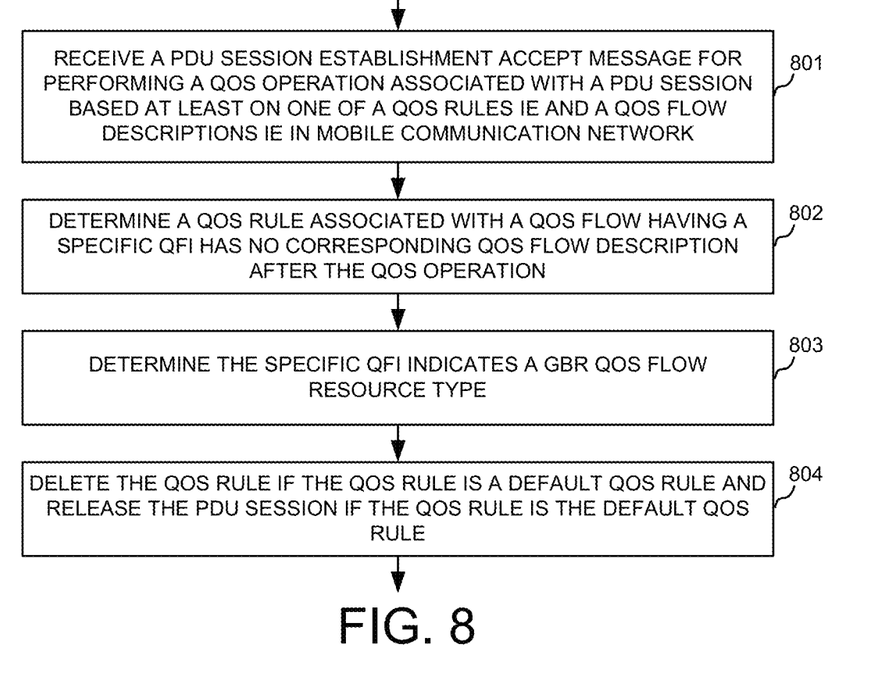
FIG. 8 is a flow chart of a method of QoS flow description handling for PDU session establishment procedure in accordance with one novel aspect of the present invention.

FIG. 8 is a flow chart of a method of QoS flow description handling for PDU session establishment procedure in accordance with one novel aspect of the present invention. In step 801, the UE receives a Protocol data unit (PDU) session establishment accept message for performing a Quality of Service (QoS) operation associated with a PDU session based at least on one of a QoS rules information element (IE) and a QoS flow descriptions IE in a mobile communication network. In step 802, the UE determines that a QoS rule associated with a QoS flow having a specific QoS flow ID (QFI) has no corresponding QoS flow description after the QoS operation. In step 803, the UE determines that the QoS flow having the specific QFI has a guaranteed bit rate (GBR) QoS flow resource type. In step 804, the UE deletes the QoS rule if the QoS rule is not a default QoS rule or releases the PDU session if the QoS rule is the default QoS rule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of performing a Quality of Service (QoS) Operation in a mobile communication network, comprising:
   receiving a Protocol data unit (PDU) session modification command message by a user equipment (UE) for performing the QoS operation associated with a PDU session based at least on one of a QoS rules information element (IE) and a QoS flow descriptions IE in the mobile communication network;
   determining that a QoS rule associated with a QoS flow having a specific QoS flow ID (QFI) has no corresponding QoS flow description, wherein the specific QFI indicates a guaranteed bit rate (GBR) QoS flow; and
   deleting the QoS rule after completing the QoS operation if the QoS rules IE contains another valid QoS rule, or rejecting the PDU session modification command message if the QoS rules IE does not contain another valid QoS rule, wherein the QoS rule is not a default QoS rule.

2. The method of claim 1, wherein the UE releases the PDU session when the QoS rule is the default QoS rule.

3. The method of claim 1, wherein a mapping between a 5QI value and a QoS flow resource type of GBR or non-GBR is predefined in the network, and wherein the 5QI value is used as the specific QFI of the QoS flow.

4. The method of claim 3, wherein the QoS operation is for "creating new QoS rule", and wherein the UE does not receive any QoS flow description for the specific QFI of the QoS rule.

5. The method of claim 1, wherein the specific QFI has a QoS flow description before the QoS operation, and wherein the QoS flow description indicates the QoS flow is a GBR QoS flow.

6. The method of claim 5, wherein the QoS operation is for "deleting existing QoS flow description", and wherein the QoS flow description associated with the QFI of the QoS rule will be deleted after the QoS operation.

7. The method of claim 1, wherein the QoS operation is for "modify existing QoS rule", and wherein the QoS rule will be associated with the specific QFI having no QoS flow description after the QoS operation.

8. The method of claim 1, wherein the UE rejects the modification command message with a 5GSM cause value indicating a QoS operation error.

9. A User Equipment (UE), comprising:
   a receiver that receives a Protocol data unit (PDU) session modification command message for performing a Quality of Service (QoS) operation associated with a PDU session based at least on one of a QoS rules information element (IE) and a QoS flow descriptions IE in a mobile communication network;
   a QoS rule and flow management circuit determines that a QoS rule associated with a QoS flow having a specific QoS flow ID (QFI) has no corresponding QoS flow description, wherein the specific QFI indicates a guaranteed bit rate (GBR) QoS flow; and a PDU session handling circuit that deletes the QoS rule after completing the QoS operation if the QoS rules IE contains another valid QoS rule, or rejects the PDU session modification command message if the QoS rules IE does not contain another valid QoS rule, wherein the QoS rule is not a default QoS rule.

10. The UE of claim 9, wherein the UE releases the PDU session when the QoS rule is the default QoS rule.

11. The UE of claim 9, wherein a mapping between a 5QI value and a QoS flow resource type of GBR or non-GBR is predefined in the network, and wherein the 5QI value is used as the specific QFI of the QoS flow.

12. The UE of claim 11, wherein the QoS operation is for "creating new QoS rule", and wherein the UE does not receive any QoS flow description for the specific QFI of the QoS rule.

13. The UE of claim 9, wherein the QoS flow of the specific QFI has a QoS flow description before the QoS operation, and wherein the QoS flow description indicates the QoS flow is a GBR QoS flow.

14. The UE of claim 13, wherein the QoS operation is for "deleting existing QoS flow description", and wherein the QoS flow description associated with the QFI of the QoS rule will be deleted after the QoS operation.

15. The UE of claim 9, wherein the QoS operation is for "modify existing QoS rule", and wherein the QoS rule will be associated with the specific QFI having no QoS flow description after the QoS operation.

16. The UE of claim 9, wherein the UE rejects the modification command message with a 5GSM cause value indicating a QoS operation error.

17. A method of performing a Quality of Service Operation (QoS) in a mobile communication network, comprising:
receiving a Protocol data unit (PDU) session establishment accept message by a user equipment (UE) for performing the QoS operation associated with a PDU session based at least on one of a QoS rules information element (IE) and a QoS flow descriptions IE in a mobile communication network;
determining that a QoS rule associated with a QoS flow having a specific QoS flow ID (QFI) has no corresponding QoS flow description after the QoS operation;
determining that the specific QFI indicates a guaranteed bit rate (GBR) QoS flow; and
deleting the QoS rule if the QoS rule is not a default QoS rule and releasing the PDU session if the QoS rule is the default QoS rule.

18. The method of claim 17, wherein a mapping between a 5QI value and a QoS flow resource type of GBR or non-GBR is predefined in the network, and wherein the 5QI value is used as the specific QFI of the QoS flow.

19. The method of claim 17, wherein the QoS operation is for "creating new QoS rule", and wherein the UE does not receive any QoS flow description for the QFI of the QoS rule.

20. The method of claim 17, wherein the UE deletes the QoS rule by sending a PDU session modification request message to the network with a 5GSM cause value indicating a QoS operation error.

* * * * *